United States Patent
Conley et al.

(10) Patent No.: US 8,751,937 B2
(45) Date of Patent: Jun. 10, 2014

(54) METHOD OF AND SYSTEM FOR DYNAMICALLY CONTROLLING DURING RUN TIME A MULTIFUNCTION PERIPHERAL (MFP) TOUCH PANEL USER INTERFACE (UI) FROM AN EXTERNAL REMOTE NETWORK-CONNECTED COMPUTER

(75) Inventors: Michael Conley, Reading, MA (US); Eric Hansen, Amherst, NH (US)

(73) Assignee: Nuance Communications, Inc., Burlington, MA (US)

(*) Notice: Subject to any disclaimer, the term of this patent is extended or adjusted under 35 U.S.C. 154(b) by 0 days.

(21) Appl. No.: 13/617,542

(22) Filed: Sep. 14, 2012

(65) Prior Publication Data

US 2013/0027734 A1     Jan. 31, 2013

Related U.S. Application Data

(63) Continuation of application No. 09/906,473, filed on Jul. 16, 2001.

(51) Int. Cl.
*G06F 3/00* (2006.01)

(52) U.S. Cl.
USPC .......................................................... 715/740

(58) Field of Classification Search
USPC ........................................ 715/740, 744, 746
See application file for complete search history.

(56) References Cited

U.S. PATENT DOCUMENTS

| | | |
|---|---|---|
| 5,323,393 A | 6/1994 | Barrett et al. |
| 5,333,286 A | 7/1994 | Weinberger et al. |
| 5,371,837 A | 12/1994 | Kimber et al. |
| 5,699,494 A | 12/1997 | Colbert et al. |
| 5,727,135 A | 3/1998 | Webb et al. |
| 5,822,221 A | 10/1998 | Groenteman |
| 5,937,150 A | 8/1999 | Phan |
| 6,094,548 A | 7/2000 | Gunning et al. |
| 6,453,127 B2 | 9/2002 | Wood et al. |
| 6,674,537 B2 * | 1/2004 | Kadowaki .................. 358/1.15 |

(Continued)

FOREIGN PATENT DOCUMENTS

| | | |
|---|---|---|
| EP | 0953901 | 11/1999 |
| EP | 1 069 500 A1 | 1/2001 |

(Continued)

OTHER PUBLICATIONS

Office Action mailed Nov. 2, 2009 from the Canadian Intellectual Property Office for Application No. 2,451,107.

(Continued)

*Primary Examiner* — Omar Abdul-Ali
(74) *Attorney, Agent, or Firm* — Wolf, Greenfield & Sacks, P.C.

(57) ABSTRACT

In a system for dynamically and remotely providing user interface (UI) display and processing information to a touch panel embedded within a multifunction peripheral (MFP) such as a digital copier having an internal computer for controlling the touch panel, a method that comprises linking the internal computer to an external data communication network having an external remote computer on the network; and upon the inputting of desired selections by a user at the UI and communicating the same over the network to the external computer, providing information from the external computer via the network back to the internal computer that enables dynamically changing or updating the UI display and behavior during run time of the MFP.

18 Claims, 3 Drawing Sheets

(56) References Cited

U.S. PATENT DOCUMENTS

Figure 1:
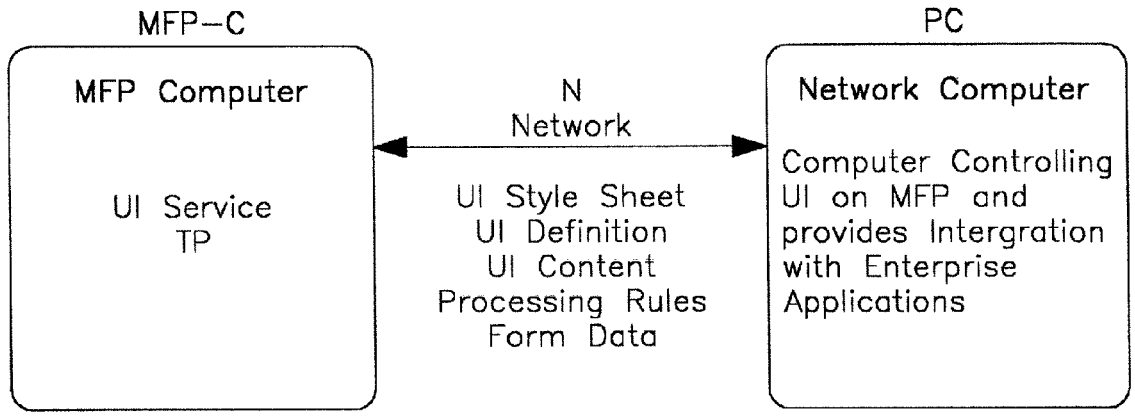

| | | | |
|---|---|---|---|
| 6,694,384 | B1 | 2/2004 | Moeller et al. |
| 6,937,997 | B1 | 8/2005 | Parulski |
| 6,980,312 | B1 * | 12/2005 | Czyszczewski et al. ..... 358/1.15 |
| 7,027,172 | B1 | 4/2006 | Parulski et al. |
| 7,185,290 | B2 | 2/2007 | Cadiz et al. |
| 7,577,910 | B1 | 8/2009 | Husemann et al. |
| 2002/0065072 | A1 | 5/2002 | Lindh |
| 2003/0011633 | A1 * | 1/2003 | Conley et al. ................. 345/762 |
| 2003/0069874 | A1 | 4/2003 | Hertzog et al. |

FOREIGN PATENT DOCUMENTS

| | | |
|---|---|---|
| EP | 1 089 189 A2 | 4/2001 |
| JP | 09-247338 | 9/1997 |
| JP | 09-325875 | 12/1997 |
| KR | 2001-0029916 A | 4/2001 |
| WO | WO 99/09658 | 2/1999 |
| WO | WO 99/15955 A1 | 4/1999 |
| WO | WO 03/009131 | 1/2003 |

OTHER PUBLICATIONS

Notification of Reason for Rejection for Japanese Application No. 2003-514407 (Publication No. 2004-538513), which is based on international Application No. PCT/IB01/02229 (Publication No. WO03/009131) Mail Date Dec. 5, 2006 (12 pages).

International Search Report for International Application No. PCT/IB01/02229 (Publication No. WO03/009131) Mail Date Nov. 10, 2003 (4 pages).

Written Opinion for International Application No. PCT/IB01/02229 (Publication No. WO03/009131) Mail Date Nov. 19, 2003 (2 pages).

Notification of Transmittal of International Preliminary Examination Report for International Application No. PCT/IB01/02229 (Publication No. WO03/009131) Mail Date Jan. 16, 2004 (3 pages).

eCopy, Inc. Press Release, "Canon U.S.A. and eCopy, Inc. Announce imageRUNNER 5000 and ScanStation Integration," AIIM 2001 New York, NY (May 1, 2001) (2 pages).

* cited by examiner

METHOD OF AND SYSTEM FOR DYNAMICALLY CONTROLLING DURING RUN TIME A MULTIFUNCTION PERIPHERAL (MFP) TOUCH PANEL USER INTERFACE (UI) FROM AN EXTERNAL REMOTE NETWORK-CONNECTED COMPUTER

RELATED APPLICATIONS

This Application claims the benefit under 35 U.S.C. §120 and is a continuation of U.S. application Ser. No. 09/906,473, entitled "METHOD OF AND SYSTEM FOR DYNAMICALLY CONTROLLING DURING RUN TIME A MULTIFUNCTION PERIPHERAL (MFP) TOUCH PANEL USER INTERFACE (UI) FROM AN EXTERNAL REMOTE NETWORK-CONNECTED COMPUTER" filed on Jul. 16, 2001, which is herein incorporated by reference in its entirety.

FIELD

The present invention relates to multifunction peripheral devices (MFP) such as document copiers and the like, being more particularly directed to such devices having embedded user interface touch panels (UI), such as digital copiers enhanced to support multi printing, faxing and scanning functions, and wherein the touch panel device is presently controlled during run time from software operating on pre-entered information running on a computer disposed locally internally within the MFP device.

BACKGROUND

Such present-day touch panel-controlled copiers and related MFP devices generally receive initializing information loaded at start-up time from an internal source. Thereafter, during run time, the touch panels are solely controlled by the information so pre-loaded into the internal computer of the copier or similar MFP device and controlled only from within the MFP device. Examples of such systems are current copiers from Canon, Toshiba, Xerox and others.

Some MFP devices may receive initializing information loaded into the internal computer from an external source at start-up time; but thereafter, during run time, the touch panels are solely controlled using only the information loaded pre-loaded into the internal computer and information loaded at start-up time. In U.S. Pat. No. 5,937,150, as another illustration, the user interface touch panel of an MFP enhanced copier is modified, up-dated or initialized by preloading only when the copier is started, reset or restarted.

In accordance with the improvement of the present invention, on the other hand, far greater flexibility of UI control is attained, and with the added capability of enabling dynamic modification and expansion of information for control during run time. This enables updating and modifying of the user interface dynamically during run time, and is effected with a remote computer externally networked to the MFP internal computer; this, as distinguished from the sole internal computer control based upon and limited to information pre-loaded into the internal MFP copier computer itself. The invention, moreover, enables novel dynamic interaction over the network and during run time, between the MFP internal computer and the external, remote network computer.

OBJECTS OF INVENTION

It is accordingly a primary object of the present invention to provide a new and improved and vastly expanded method of and system for dynamically controlling, during and throughout run time, a multifunction peripheral (MFP) device touch panel user interface (UI) from an external remote network-connected computer that enables far greater flexibility of control and with dynamic modification and expansion of information continually during the MFP run operation, than is possible with just the local computer control of the touch panel from within the MFP device based just upon the information preloaded into the MFP internal computer at initialization or reset thereof.

A further object is to provide such a novel method and system that is particularly adapted for and useful with document copiers and the like with embedded touch panel user interface displays for controlling the MFP functions and applications.

Still another object is to enable novel dynamic real-time interactive communication between the MFP internal computer and the network-connected external or remote computer of the invention, continually throughout run time, for providing and modifying display content and processing rules and the like required or desirable for updating the user interface.

Other and further objects will be explained hereinafter and are more fully set forth in the appended claims.

SUMMARY

In summary, however, from one of its important aspects, the invention embraces a system for providing user interface (UI) display and processing information to a touch panel provided with a multifunction peripheral (MFP) device and controlled by a computer disposed internally of the MFP and connected to an external data communication network, the system having, in combination, an external computer connected on the network remotely of the MFP device; and the external computer being provided with software adapted for remotely providing information to the MFP device internal computer, via the network, for dynamically changing the UI display and behavior during run-time of the system.

Preferred and best mode embodiments and designs are later detailed.

DRAWINGS

Figure 2:
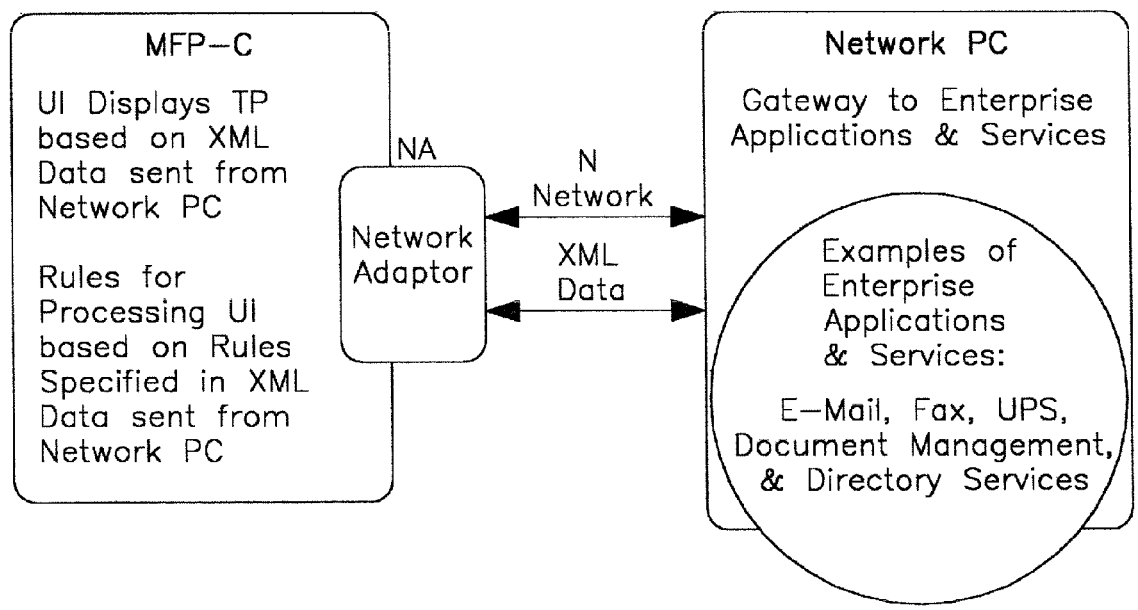
Figure 3:
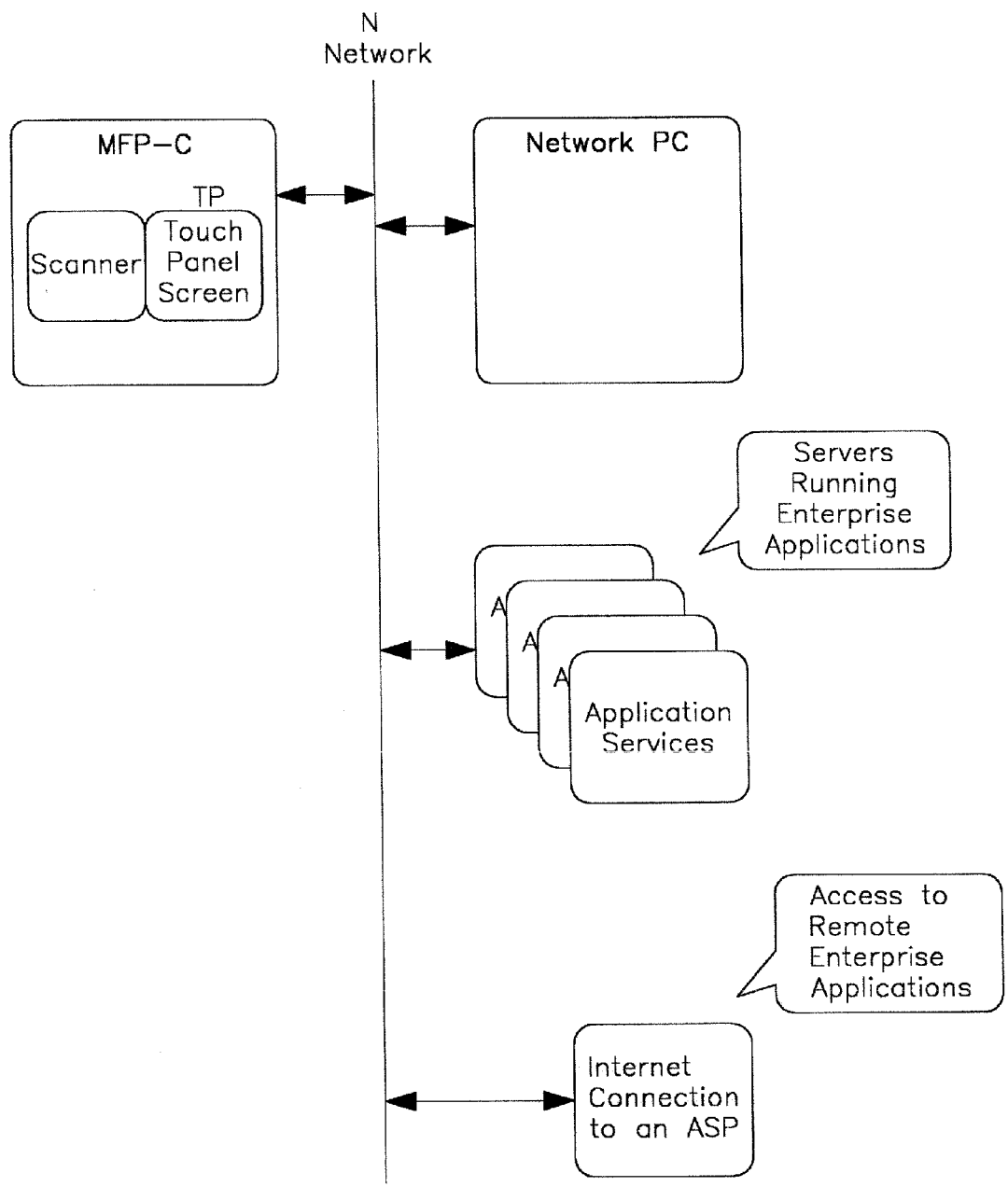
Figure 4:
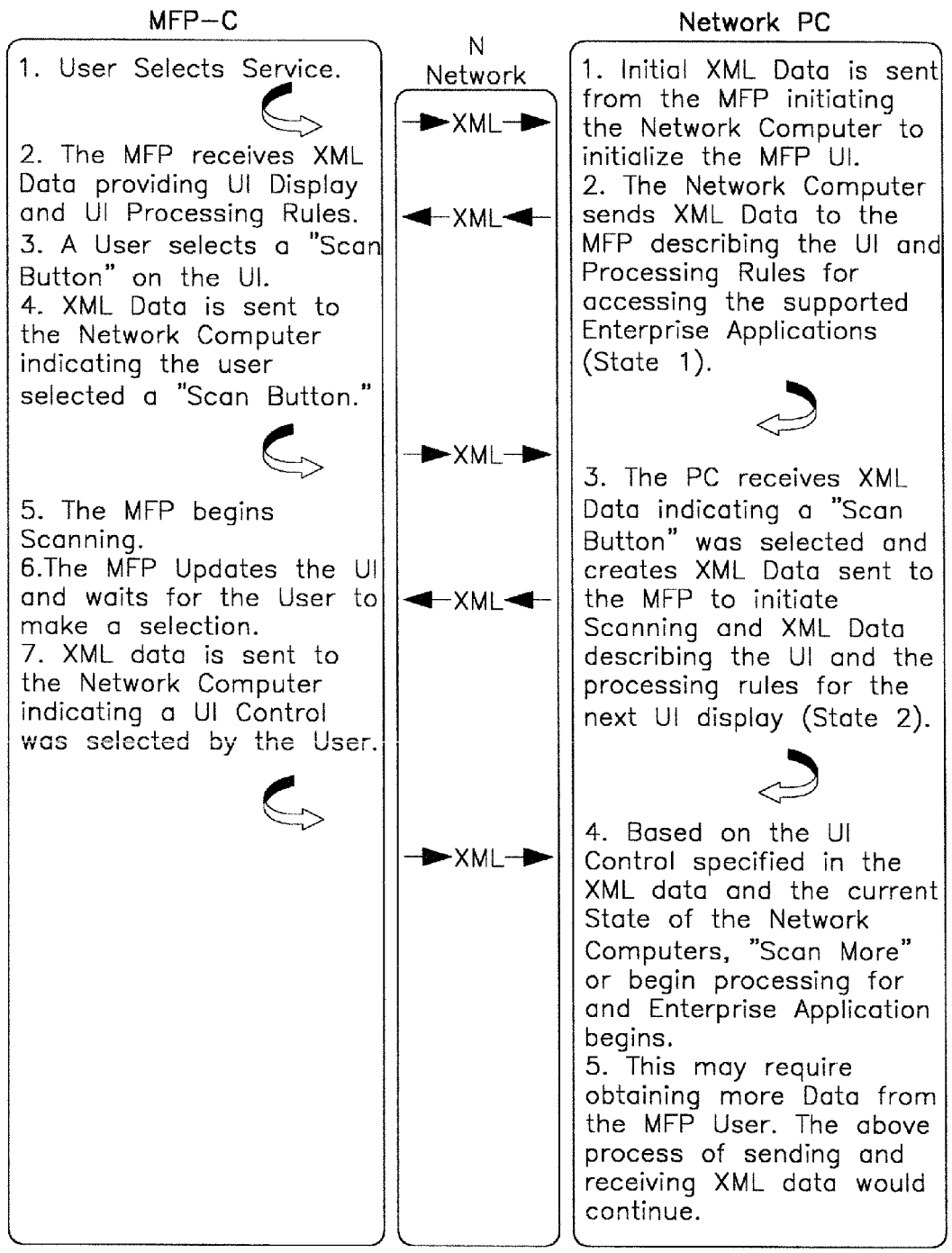

The invention will now be explained in connection with the accompanying drawings, FIG. 1 of which is a simplified architectural overview block diagram over the concept underlying the present invention;

FIGS. 2 and 3 are respectively somewhat more detailed block diagrams of the methodology, system and network interconnection of the MFP device (copier) and remote network-connected computer, illustrated as an external or remote PC, and representing a preferred format of the invention; and FIG. 4 is a flow chart diagram of exemplary communication and interactive run-time operation between the MFP internal computer and the remote or external network computer of FIGS. 2 and 3.

PREFERRED EMBODIMENT(S) OF THE INVENTION

Referring, first, to FIG. 1, the invention is diagrammatically illustrated as implemented by an interactive network N connected between the MFP internal computer MFP-C, normally controlling the user interface display touch panel TP, as above-explained, and the remote or external network-connected computer PC, also now employed in accordance with the methodology of the present invention.

User interface displays and processing information are provided to the MFP device (i.e. copier) touch panel TP embedded within the copier under control of the internal computer software program for enabling the copier to perform its MFP functions for copying, printing, and scanning, etc. In accordance with the invention, a network adapter (NA) included in the copier, connects the same through the communication linking network N with the remote or external computer PC which the invention uses to provide information over the network N to the copier internal computer MFP-C to dynamically change the UI touch panel (TP) display and behavior during run time operation of the copier, and as desired by the user presenting selections to the remote external PC.

The copier touch panel TP provides its display while including, as is well known, a pointing device used by MFP users to access the document scanning and also desired enterprise applications, such as, for example, document management (DM), FIG. 2, E-mail, fax server, directory services, application service providers (ASP) and document delivery services, and the like, FIGS. 2 and 3. The network PC is used, as more particularly shown in said FIGS. 2 and 3, as a gateway for integrating the copier (or other MFP device) with one or more of such enterprise applications running on one or more application servers. The PC software thus controls the touch panel TP of the copier to display the user interface processing information required to integrate scanned documents with the before-mentioned enterprise applications. Exemplary of the latter are Microsoft Exchange, Lotus Notes, and Novell Group Wise as E-mail; Lotus Domino.Doc, iManage and Open Text LiveLink, as document management (DM): Captaris RightFax, Omtool Fax Sr. and Optus FACSys as fax servers; Microsoft Active Directory, Novell Directory Services as directory services; e-Fax as application service providers (ASP); and UPS as secure document delivery, as illustrations.

In run time, once the copier user inputs data (UI) using the touch panel TP, extensible mark-up language data (XML) is sent back along the network N (to the right in FIGS. 2 and 3) to the network computer PC. The interactive facility accorded by the invention will, at this point, permit the external computer PC to send additional XML data back to the copier computer MFP-C required to update the UI touch panel TP in order for the copier user to supply additional data. This capability, in accordance with the invention, for the remote or external computer PC and the copier internal computer MFP-C to exchange XML data via the network N, provides the necessary integration of the above-described enterprise applications and the document scanning by the copier.

The invention also permits the use of other types of display information to be sent between the external or remote network computer PC and the internal copier computer MFP-C, such as HTML, binary data, or text, as other examples.

Through this novel methodology, moreover, a wide range of run-time updating and modifying XML data, FIGS. 2 and 4, can dynamically and continually be provided, including, but not limited to the remote network computer PC providing:

1) a description of the presentation (how to display) of the UI controls on the touch panel TP;
2) a low resolution image of the pages being scanned and display information for displaying these images on the touch panel TP;
3) a description of default values for each UI control displayed on the touch panel TP;
4) a description of the processing rules to be used by the computer program or software running on the copier internal computer MFP-C to process the data within each UI control displayed on the touch panel TP;
5) an updated description of default data values for a UI control that may differ from the initial default values of sub-paragraph 3), above.
6) The data described in one or more of sub-paragraphs 1)-5), above, that results in providing UI descriptions that are unique for each copier user (i.e. personalized presentations—identifying a name and having unique access or functions available at the touch panel for that individual).

Additionally, the interactive nature of the system of the invention enables the copier internal computer MFP-C not only to process UI selections made by the copier user, but enables the MFP-C also to send the user-selected data via the network N to the external computer PC for further processing, as well.

Summarizing, therefore, the invention enables the remote or external network computer PC to communicate information during run time, dynamically over the network N, (to the left in the drawings) to the copier internal computer MFP-C, that can a) dynamically provide the UI presentation form data (Style Sheet description, FIG. 1); b) dynamically change the content contained in the UI; c) dynamically define the rules for processing each control within the UI at the touch panel TP; and d) dynamically change the content displayed within such a UI control. In return, the internal computer at the copier MFC-C can provide the external network computer PC with the form data selected by the UI operator or user. It should be observed, furthermore, that all of the above-described actions occur during run time and, unlike current-day practice before described, do not require an MFP device reset.

As for the external network computer PC of the invention, and again in summary, but more specifically in accordance with the invention, it is employed to describe the information required to create and process the UI on the copier (or other MFP) touch panel IP. The following specific data streams are communicated over the network:

1.) XML data providing the UI presentation (Style Sheet) that contains a description of how to display each UI control;
2.) XML data that contains:
   the definitions for each UI control,
   the initial values for each UI control, and
   the input processing rules for each UI control;
3.) XML data used by the copier (MFP) computer to initiate a request for new content within a UI control, with the network computer PC updating the XML data with new content, and returning the same via the network to the copier computer MFP-C; and
4.) XML data used to provide the UI information selected by the copier user or operator to the external network computer PC.

As before stated, FIG. 4 presents a detailed flow diagram exemplary of preferred communication between the internal copier computer MFP-C and the external network computer PC in accordance with the procedures of the invention. Steps 1-7 are illustrated at the left-hand side for operation at the copier with its internal MFP computer and UI touch panel. These are appropriately horizontally aligned with steps 1-5 illustrated at the right as performed by the remote network computer PC in response to respective interactive XML data over the interconnecting network N.

Once the copier user has selected the desired service (MFP step 1), this is communicated (to the right) as XML data over the network N to the remote network PC, where the initial XML data from the MFP copier initiates the network computer PC to initialize the MFP UI (PC step 1). The PC then sends XML data (to the left) back to the MFP copier describing the UI and processing rules for accessing the chosen supported enterprise applications ("State 1"). At MFP step 2, the XML data is received, providing UI display (IP) and UI processing rules. The user then selects a "Scan Button" on the UI (step 3), and corresponding XML data is sent (to the right) to the remote network computer PC indicating such user selection of a "Scan Button" (step 4). At its step 2, the network computer PC receives this XML data indicating the selected "Scan Button" and creates XML Data at PC (step 3) which is sent (to the left) back to the MFP copier to initiate scanning thereat and also to describe the UI at the display TP and the processing rules for the next UI display at TP ("State 2"). In its step 5, the copier begins scanning and it also updates the UI and waits for the user to make a selection of a UI control (step 6). Upon such selection of a UI control (step 7), XML data indicative thereof is communicated to the network PC; and based thereon and the current state of the PC, either "Scan More" or begin processing for an enterprise application begins (PC step 4). As indicated in PC step 5, this may require obtaining more data from the copier user. The above process of sending and receiving XML data will then continue as desired.

The invention thus provides significant operational flexibility and enhancement over present-day copiers and the like which, as before explained, only provide capability from a pre-loaded computer running inside the copier as opposed to being external to the copier. When the copier first starts up, it loads information from an internal source or may load data from an external source; but from that point on, it never uses an external source again. The internal computer uses only this preloaded data it stored inside its hard disc drive. This is as distinguished from the present invention where, once the copier is started up and the user starts using the copier, the UI can change based on user inputs networked to the external computer and instructions sent back by the external computer via the communication linking network to the copier internal computer. This operation, moreover, permits the further novel feature that once the user has identified himself or herself at the copier touch panel, depending on the desired scope of the user's job, an appropriate screen may automatically be presented that is unique to that individual user. The touch panel can thus dynamically present different screens as the opening screens for different users, or other user interface unique capabilities dynamically tailored for that user—and all as distinguished from today's operations where every user is presented with the same touch panel screen, or with screens pre-determined by information embedded on the copier computer itself that cannot be dynamically updated based upon who the user is, or upon the application with which there is interaction, or what changes may be desirable.

While described in connection with the important and preferred application to MFP copiers with embedded touch panels for display and control by an internal computer provided with a network-connection adapter for connection to a network, itself having a remote network computer, the technique of the invention, as also earlier noted, may also be applied to other types of MFP devices and UI displays and controls; and such, together with further modifications that will also occur to those skilled in this art, are considered also to fall within the spirit and scope of the present invention, as defined in the appended claims.

The invention claimed is:

1. A multifunction peripheral device capable of communicating with an external computer over a network, the multifunction peripheral device comprising:
   a user interface including a touch panel display to display user interface controls that allow a user to access a set of capabilities of the multifunction peripheral device; and
   an internal computer coupled to the user interface, the internal computer programmed to operate the multifunction peripheral device to perform operations associated with the set of capabilities, the internal computer programmed to, subsequent to the user selecting a service, communicate to the external computer via the network that the service has been selected, and to receive information, provided by the external computer via the network, describing at least one user interface control to be displayed on the touch panel display and/or at least one processing rule for at least one user interface control, the internal computer programmed to update the touch panel display based on the received information,
   wherein information received by the multifunction peripheral device from the external computer includes extended mark-up language (XML) data describing content to be displayed on the touch panel display.

2. The multifunction peripheral device of claim 1, wherein the information describes the presentation of at least one user interface control to be displayed on the touch panel display, and wherein the internal computer is programmed to use the information to update the touch panel display to display the at least one user interface control according to the presentation description.

3. The multifunction peripheral device of claim 2, wherein the information includes at least one processing rule describing one or more operations to be performed when the user activates the at least one user interface control.

4. The multifunction peripheral device of claim 3, wherein the at least one processing rule includes instruction to the internal computer to send information to the external computer via the network when the user activates the at least one user interface control.

5. The multifunction peripheral device of claim 1, wherein the multifunction peripheral device is configured to receive, from the external computer via the network, user specific information to be displayed on the touch panel display, the user specific information describing capabilities available to the specific user, and wherein the internal computer is programmed to display the available capabilities on the touch panel display.

6. A multifunction peripheral device capable of communicating with an external computer over a network, the multifunction peripheral device comprising:
   a user interface including a touch panel display to display user interface controls that allow a user to access a set of capabilities of the multifunction peripheral device; and
   an internal computer coupled to the user interface, the internal computer programmed to operate the multifunction peripheral device to perform operations associated with the set of capabilities, the internal computer programmed to, subsequent to the user selecting a service, communicate to the external computer via the network that the service has been selected, and to receive information, provided by the external computer via the network, describing at least one user interface control to be displayed on the touch panel display and/or at least one processing rule for at least one user interface control, the internal computer programmed to update the touch panel display based on the received information, wherein the multifunction peripheral device is configured to receive, from the external computer, application information capable of, at least in part, controlling the touch panel display to display processing information needed to integrate the multifunction peripheral device with at least one enterprise application.

7. A method of communicating between a multifunction peripheral device and an external computer over a network, the multifunction peripheral device comprising a user interface including a touch panel display to display user interface controls that allow a user to access a set of capabilities of the multifunction peripheral device, the method comprising:
receiving indication via the user interface that a user has selected a service;
communicating to the external computer via the network that the service has been selected;
receiving information, provided by the external computer via the network, describing at least one user interface control to be displayed on the touch panel display and/or at least one processing rule for at least one user interface control, wherein information received by the multifunction peripheral device from the external computer includes extended mark-up language (XML) data describing content to be displayed on the touch panel display; and
updating the touch panel display based on the received information.

8. The method of claim 7, wherein the information describes the presentation of at least one user interface control to be displayed on the touch panel display, and wherein updating includes updating the touch panel display to display the at least one user interface control according to the presentation description.

9. The method of claim 8, wherein the information includes at least one processing rule describing one or more operations to be performed when the user activates the at least one user interface control.

10. The method of claim 9, further comprising sending information to the external computer via the network in response to the at least one processing rule.

11. The method of claim 7, comprising:
receiving, from the external computer via the network, user specific information to be displayed on the touch panel display, the user specific information describing capabilities available to the specific user; and
displaying the available capabilities on the touch panel display.

12. A method of communicating between a multifunction peripheral device and an external computer over a network, the multifunction peripheral device comprising a user interface including a touch panel display to display user interface controls that allow a user to access a set of capabilities of the multifunction peripheral device, the method comprising:
receiving indication via the user interface that a user has selected a service;
communicating to the external computer via the network that the service has been selected;
receiving information, provided by the external computer via the network, describing at least one user interface control to be displayed on the touch panel display and/or at least one processing rule for at least one user interface control;
updating the touch panel display based on the received information; and
receiving, from the external computer, application specific information capable of, at least in part, controlling the touch panel display to display processing information needed to integrate the multifunction peripheral device with at least one enterprise application to which the application specific information relates.

13. At least one non-transitory computer readable medium encoded with a software program that, when executed by a computer, performs a method of communicating between a multifunction peripheral device and a external computer over a network, the multifunction peripheral device comprising a user interface including a touch panel display to display user interface controls that allow a user to access a set of capabilities of the multifunction peripheral device, the method comprising:
receiving indication via the user interface that a user has selected a service;
communicating to the external computer via the network that the service has been selected;
receiving information, provided by the external computer via the network, describing at least one user interface control to be displayed on the touch panel display and/or at least one processing rule for at least one user interface control, wherein information received by the multifunction peripheral device from the external computer includes extended mark-up language (XML) data describing content to be displayed on the touch panel display; and
updating the touch panel display based on the received information.

14. The at least one non-transitory computer readable medium of claim 13, wherein the information describes the presentation of at least one user interface control to be displayed on the touch panel display, and wherein updating includes updating the touch panel display to display the at least one user interface control according to the presentation description.

15. The at least one non-transitory computer readable medium of claim 14, wherein the information includes at least one processing rule describing one or more operations to be performed when the user activates the at least one user interface control.

16. The at least one non-transitory computer readable medium of claim 13, wherein the method further comprises sending information to the external computer via the network in response to the at least one processing rule.

17. The at least one non-transitory computer readable medium of claim 13, the method comprising:
receiving, from the external computer via the network, user specific information to be displayed on the touch panel display, the user specific information describing capabilities available to the specific user; and
displaying the available capabilities on the touch panel display.

18. At least one non-transitory computer readable medium encoded with a software program that, when executed by a computer, performs a method of communicating between a multifunction peripheral device and a external computer over a network, the multifunction peripheral device comprising a user interface including a touch panel display to display user interface controls that allow a user to access a set of capabilities of the multifunction peripheral device, the method comprising:
receiving indication via the user interface that a user has selected a service;
communicating to the external computer via the network that the service has been selected;
receiving information, provided by the external computer via the network, describing at least one user interface control to be displayed on the touch panel display and/or at least one processing rule for at least one user interface control;

updating the touch panel display based on the received information; and receiving, from the external computer, application information capable of, at least in part, controlling the touch panel display to display processing information needed to integrate the multifunction peripheral device with at least one enterprise application.

* * * * *